United States Patent
Singh et al.

[11] Patent Number: 5,928,805
[45] Date of Patent: Jul. 27, 1999

[54] COVER AND STARTUP GAS SUPPLY SYSTEM FOR SOLID OXIDE FUEL CELL GENERATOR

[75] Inventors: Prabhakar Singh, Export; Raymond A. George, Pittsburgh, both of Pa.

[73] Assignee: Siemens Westinghouse Power Corporation, Orlando, Fla.

[21] Appl. No.: 08/974,861

[22] Filed: Nov. 20, 1997

[51] Int. Cl.⁶ .................................................. H01M 8/22
[52] U.S. Cl. .............................. 429/13; 429/13; 429/17; 429/19; 429/20; 429/26; 429/30
[58] Field of Search .................. 429/13, 17, 19, 429/20, 26, 30

[56] References Cited

U.S. PATENT DOCUMENTS

| | | | |
|---|---|---|---|
| 4,395,468 | 7/1983 | Isenberg | 429/31 |
| 4,702,971 | 10/1987 | Isenberg | 429/31 |
| 5,143,800 | 9/1992 | George et al. | 429/20 |
| 5,306,574 | 4/1994 | Singh et al. | 429/13 |
| 5,413,879 | 5/1995 | Domeracki et al. | 429/30 |
| 5,541,014 | 7/1996 | Micheli et al. | 429/19 |

*Primary Examiner*—Maria Nuzzolillo
*Assistant Examiner*—Monique Wills

[57] ABSTRACT

A cover and startup gas supply system for a solid oxide fuel cell power generator is disclosed. Hydrocarbon fuel, such as natural gas or diesel fuel, and oxygen-containing gas are supplied to a burner. Combustion gas exiting the burner is cooled prior to delivery to the solid oxide fuel cell. The system mixes the combusted hydrocarbon fuel constituents with hydrogen which is preferably stored in solid form to obtain a non-explosive gas mixture. The system may be used to provide both non-explosive cover gas and hydrogen-rich startup gas to the fuel cell.

20 Claims, 4 Drawing Sheets

COVER AND STARTUP GAS SUPPLY SYSTEM FOR SOLID OXIDE FUEL CELL GENERATOR

STATEMENT OF GOVERNMENT INTEREST

The Government of the United States of America has certain rights in this invention pursuant to Contract No. DE-FC21-91MC28055 awarded by the United States Department of Energy.

FIELD OF THE INVENTION

The present invention relates to solid oxide fuel cell power generators, and more particularly relates to a cover and startup gas supply system for the operation of such generators.

BACKGROUND INFORMATION

Solid Oxide Fuel Cell (SOFC) power generation systems capable of operating on coal derived and hydrocarbon fuels (e.g., natural gas, diesel, etc.) are being developed for stationary and mobile land based applications. Several SOFC prototype demonstration units, ranging in sizes from 3 kWe to 25 kWe, have been fabricated and field tested using hydrogen and water gas mixtures and natural gas as fuels.

SOFC power generation systems offer lower stack pollution levels in the exhaust gas stream due to the electrochemical oxidation of fuels at relatively lower cell operating temperatures, which reduces $NO_x$ emissions, and due to the use of clean sulfur free fuels, which reduces $SO_x$ emissions. Such systems also provide higher power conversion efficiency (kWeH/MBTU of fuel) in comparison with other types of power generation systems. SOFC systems may also be of modular construction, making the systems ideal for various power generation applications.

Examples of SOFC systems are disclosed in U.S. Pat. No. 4,395,468 to Isenberg, U.S. Pat. No. 4,702,971 to Isenberg, U.S. Pat. No. 5,143,800 to George et al., U.S. Pat. No. 5,306,574 to Singh et al. and U.S. Pat. No. 5,413,879 to Domeracki et al., each of which is incorporated herein by reference.

The long term successful operation of SOFC generators depends primarily on maintaining structural and chemical stability of fuel cell components during steady state conditions, as well as transient operating conditions such as cold startups and emergency shut downs. During steady state operation, nickel-containing cell fuel components such as electrodes and contact members (e.g., nickel felt contacts for cell to cell and cell to bus bar connections) are exposed to a fuel gas atmosphere in which nickel remains thermodynamically stable as nickel metal. During such steady state operation, the oxygen pressure of the fuel gas is lower than the Ni/NiO equilibrium oxygen pressure. The SOFC air electrode, typically made of doped lanthanum manganite, similarly remains chemically and structurally stable in the surrounding air atmosphere during steady state conditions.

Under transient operating conditions such as cold startups and emergency shut downs, non explosive $N_2$—$H_2$ gas mixtures (typically a $N_2$-3% $H_2$ gas mixture) known as "NH mix" cover gases are conventionally used in SOFCs to preserve and maintain the chemical stability of the nickel fuel electrode and nickel felt connections. In addition, hydrogen-rich gas streams have been used in SOFC's during startup current loading prior to switching to the primary fuel, such as natural gas. On-site gas storage of both NH mix and $H_2$ gases has been required for conventional systems. However, storage of gas cylinders in the proximity of SOFC generators requires a large amount of space and, in the case of $H_2$, elaborate safety measures for the prevention of explosion. For larger SOFC systems where NH mix and hydrogen-rich gas requirements are expected to be very large, storage of gases will put even a higher demand on safety and space requirements. This scenario does not appear attractive for situations where gas storage space and accessibility is limited. The above arrangements may also prove very expensive (higher gas costs, cylinder leasing expenses, transportation expenses, etc.) for the operation of the generators.

A system for on site generation of non explosive $N_2$—$H_2$ cover gas and $H_2$-rich startup gas would be highly advantageous during the startup and cool down of SOFC power generation systems. Such a system would represent a major improvement over on site storage of $N_2$, $H_2$ or $N_2$—$H_2$ blend gas cylinders. The present invention has been developed in view of the foregoing.

SUMMARY OF THE INVENTION

The present invention provides an apparatus and method for generating non-explosive cover gas during heat up and cool down operations of a SOFC. The system mixes combusted hydrocarbon fuel constituents ($H_2$, CO, $CO_2$, $H_2O$, $N_2$, etc.) with hydrogen which is preferably stored in solid metal hydrides to obtain a non-explosive gas mixture. The gas mixture remains reducing to the SOFC fuel electrode and nickel felt contacts during heat-up and cool down conditions, at temperatures typically ranging from room temperature to about 1,000° C. For startup current loading, hydrogen-rich fuel gas known as startup gas is generated by mixing substoichiometric hydrocarbon combustion products with hydrogen, stored in the metal hydrides.

An object of the present invention is to provide a system for supplying startup gas and cover gas in a solid oxide fuel cell power generation system. The system includes a burner, a supply of hydrocarbon fuel and oxygen-containing gas to the burner, a heat exchanger or other device for cooling combustion gas exiting the burner, a storage tank for delivering at least a portion of the cooled combustion gas to the solid oxide fuel cell, and a hydrogen storage unit for adding hydrogen gas to the combustion gas prior to delivery to the solid oxide fuel cell.

Another object of the present invention is to provide a method of supplying startup gas and cover gas in a solid oxide fuel cell power generation system. The method includes the steps of supplying hydrocarbon fuel and oxygen-containing gas to a burner, cooling the combustion gas exiting the burner, delivering at least a portion of the cooled combustion gas to the solid oxide fuel cell, and adding hydrogen gas to the combustion gas prior to delivery to the solid oxide fuel cell.

These and other objects of the present invention will be more readily understood from the following description.

DETAILED DESCRIPTION OF THE PREFERRED EMBODIMENTS

In accordance with the present invention, a controlled amount of hydrocarbon fuel, such as desulfurized compressed natural gas or diesel fuel, is combusted with a mixture of oxygen-containing gas, such as air, and recirculated combustion products in a cooled burner or catalytic combustor.

Figure 1:
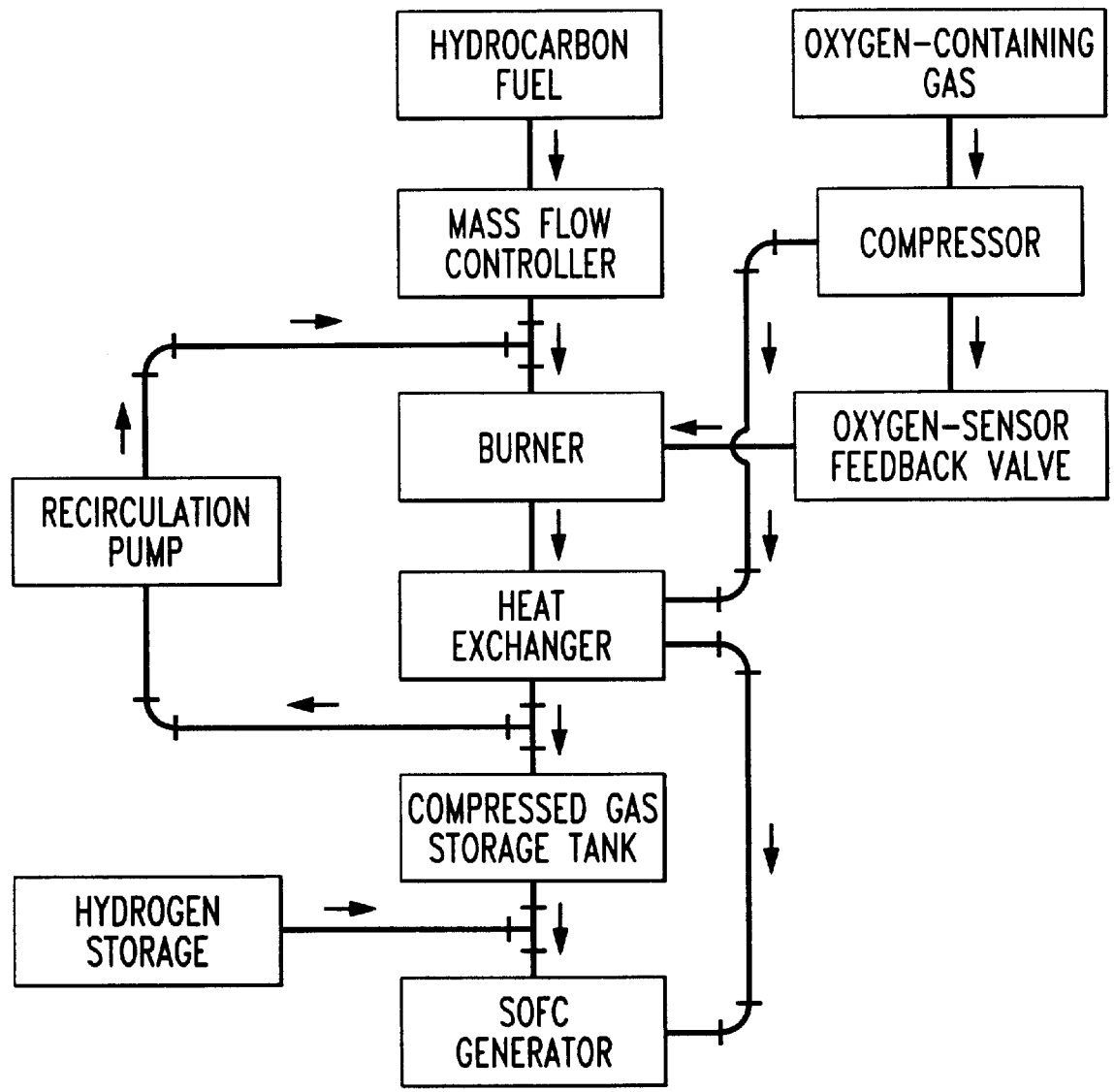
FIG. 1 is a schematic illustration of a cover gas generation system in accordance with an embodiment of the present invention.

FIG. 1 schematically illustrates a cover gas generation system in accordance with an embodiment of the present invention. A hydrocarbon fuel such as natural gas is supplied to a burner by a conventional mass flow controller. Oxygen-containing gas such as air is supplied by a compressor to an oxygen-sensor feedback valve which is used to supply a desired amount of the oxygen-containing gas to the burner. The burner is of any suitable conventional design known to those skilled in the art. The air/combustion product mixture and the fuel ratio entering the burner is preferably monitored and controlled by an oxygen sensor feed back valve. The oxygen sensor feed back valve determines the amount of the air stream entering the burner based on the oxygen potential of the combustion products formed/required in the burner. For cover gas generation, the air/fuel ratio is preferably maintained near stoichiometric (approximately 0.99) to achieve a preferred level of about 3 percent hydrogen in the gas mix. For the more reducing combustion products present in the start up gas, the valve reduces the amount of air entering the burner to achieve a hydrogen-rich stream for startup loading of the generator. At this stage, the air/fuel ratio is preferably from about 0.4 to about 0.6.

Combustion gas exiting the burner travels through a heat exchanger and is preferably stored in a compressed gas storage tank. A small storage tank is preferably used so that gas trim can be maintained during the burner startup or other emergency conditions. A portion of the heat exchanger exhaust is recirculated by means of a pump to the burner. A fraction of the cold exhaust gas stream is thus recirculated and mixed with the incoming oxygen-containing gas stream entering the burner for the combustion of the fuel. Addition of the cold combustion gas stream to the oxygen-containing gas stream entering the burner has two important functions. First, addition of combustion products to the burner/combustor prevents carbon deposition in the burners even under near stoichiometric operation conditions by increasing the availability of $H_2O$, $CO_2$ etc. in the gas stream. Second, addition of combustion products to the burner feed stream reduces the combustion temperature in the burner, resulting in prolonged burner life.

The cooled combustion gas is fed from the storage tank to a conventional solid oxide fuel cell generator. In addition, stored hydrogen is selectively added to the cooled combustion gas prior to delivery of the gas to the solid oxide fuel cell. Hydrogen from, for example, a metal hydride storage system, can be mixed with the combusted gas stream to maintain the desired hydrogen concentration in the final gas stream entering the gas storage container or SOFC generator. Hydrogen content of the gas stream is adjusted to obtain a non-explosive gas chemistry which still remains reducing to Ni/NiO in the cover gas mode. In the presence of such a gas stream, nickel from the fuel electrode and cell connectors remains unoxidized during cell heat-up and cool down. As more fully described below, the preferred metal hydride system advantageously stores hydrogen in the solid state, remains compact and can be charged and discharged repeatedly with hydrogen. The hydrogen storage capacity of the metal hydrides remains very high, requiring only a small volume on the order of about 5 to 10 cubic feet for a 20 to 100 kWe SOFC system.

Figure 2:
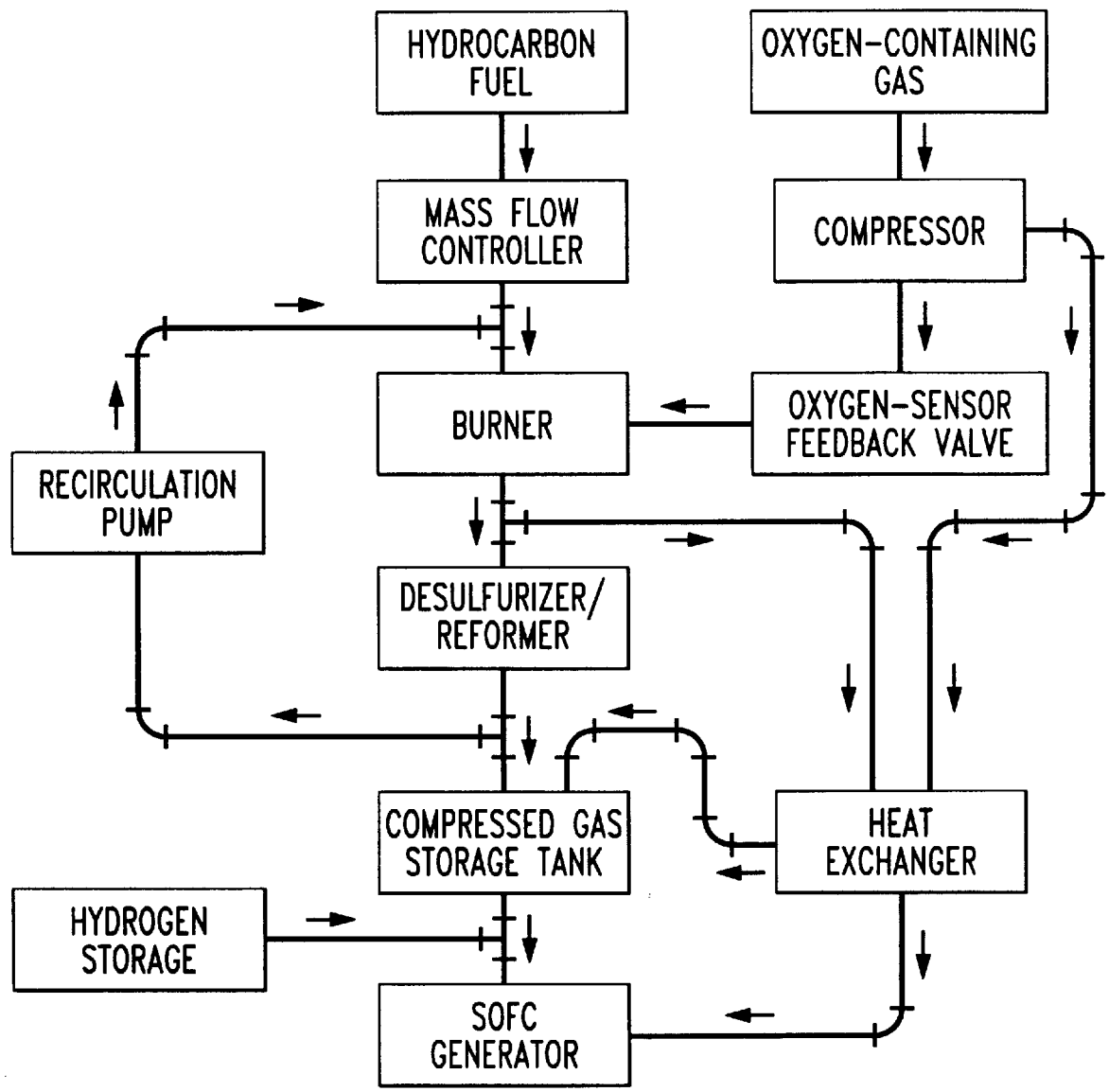
FIG. 2 is a schematic illustration of a cover gas generation system in accordance with another embodiment of the present invention.
Figure 3:
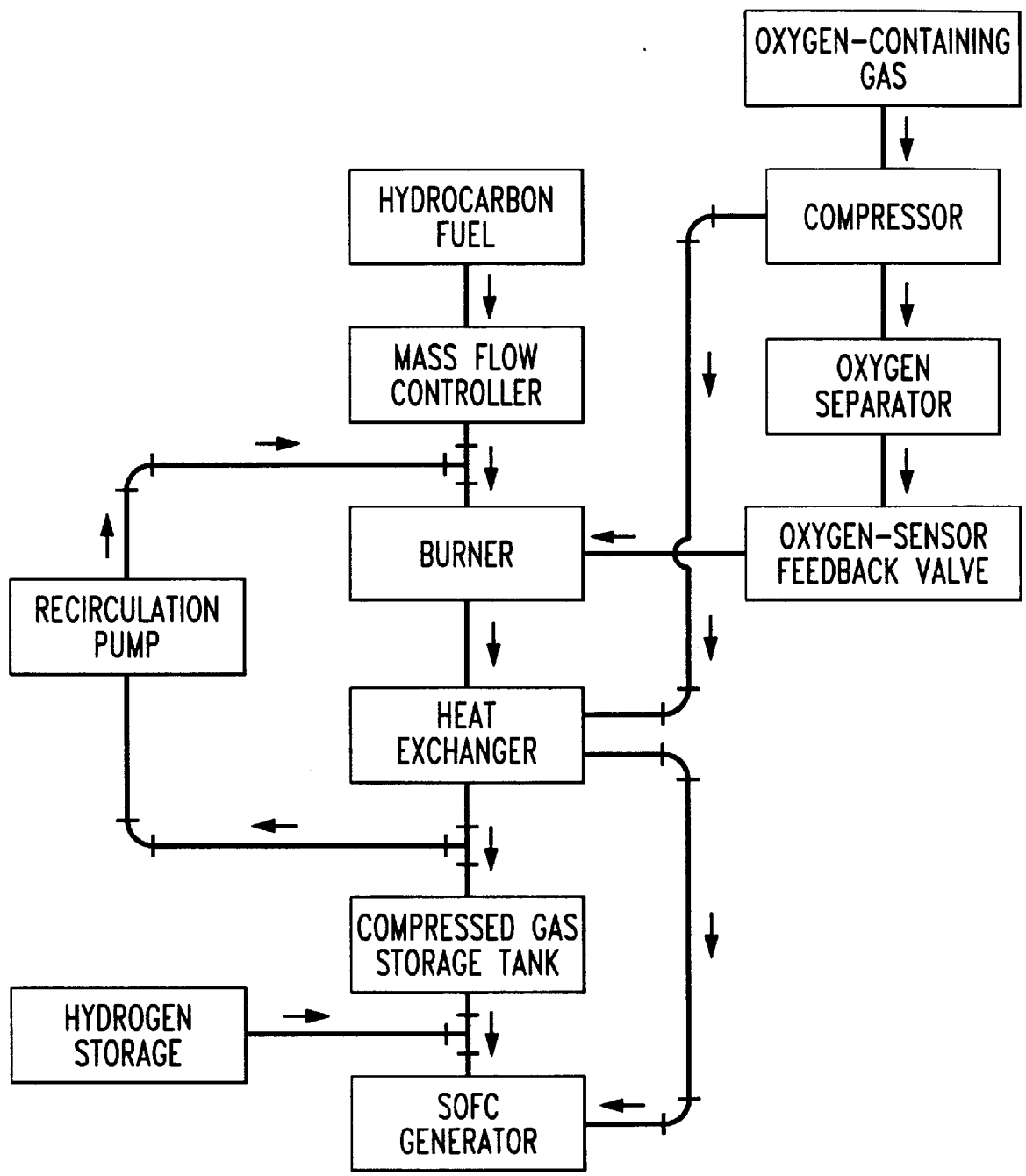
FIG. 3 is a schematic illustration of a cover gas generation system in accordance with a further embodiment of the present invention.

The product gas stream exiting the burner flows through a heat exchanger as shown in FIGS. 1 and 3, or through a reformer/desulfurizer unit and an optional heat exchanger as shown in FIG. 2, for further cooling of the gas stream. In the embodiments shown in FIGS. 1 and 3, natural gas is preferably used as the hydrocarbon fuel. In the embodiment of FIG. 2, a logistic fuel such as diesel fuel is the preferred hydrocarbon fuel for operation of the SOFC power generation system. The heat exchanger preheats the compressed auxiliary air stream prior to its entry in the SOFC generator where the reformer preheating is achieved prior to the startup of the generator.

The cooled gas stream exiting the heat exchanger and/or the reformer units may be mixed with a desired amount of hydrogen gas to obtain a non-explosive cover gas chemistry suitable for use in the SOFC. A hydrogen storage system is used for trim purposes in which the gas composition is adjusted, and is also useful if operation of the burner in the substoichiometric mode remains unreliable due to carbon deposition, insufficient cooling or the like.

In the preferred embodiment, the hydrogen is stored in solid form using reversible metal hydride alloys. While metal hydride storage is preferred in accordance with the present invention, cryogenic storage systems may also be used wherein the hydrogen is liquified. Metal hydride alloys are capable of absorbing large quantities of hydrogen at room temperature, and releasing the hydrogen at relatively low pressure. Suitable metal hydrides include alloys of Ti, Zr, Fe, Mn, Ni, Ca, La, mischmetal, cerium-free mischmetal, Al, Mg, Cu and Li. Particularly suitable metal hydrides include TiFe, $Ti(Fe_{0.9}Mn_{0.1})$, $Ti(Fe_{0.8}N_{0.2})$, $Zr(Ni_{0.95}M_{0.05})$, $CaNi_5$, $(Ca_{0.7}M_{0.3})Ni_5$, $(Ca_{0.2}M_{0.8})Ni_5$, $MNi_5$, $LaNi_5$, $(CFM)Ni_5$, $LaNi_{4.7}Al_{0.3}$, $MNi_{4.5}Al_{0.5}$, $MNi_{4.15}Fe_{0.85}$, $LaNi_{4.25}Al_{0.75}$, $Mg_2Ni$ and $Mg_2Cu$, wherein M is mischmetal and CFM is cerium-free mischmetal. The alloys are typically provided in granular form and may be sized to −10 mesh or less. Hydrogen is stored in the alloy as a solid metal. The metal hydride system can be recharged with hydrogen numerous times. Such metal hydride hydrogen storage systems are compact and safe during operation, unlike other means of gas storage systems such as tank storage.

Compressed gas may be stored in a small tank (not shown) for emergency situations. Even after condensation of the water vapor in the storage tank, the gas chemistry remains non-explosive. A bypass loop is preferably provided across the reformer to obtain direct access to the SOFC generator during the generator cool down mode.

FIG. 2 schematically illustrates a system similar to the system of FIG. 1, but which is particularly suitable for use with diesel fuel. In the embodiment of FIG. 2, the diesel fuel is desulfurized and reformed prior to introduction into the SOFC generator. The desulfurizer/reformer shown in FIG. 2 preferably comprises a hydrodesulfurizer including a Co—Mo catalyst and a ZnO reactive metal bed for hydrotreating and reacting gaseous $H_2S$. Organic sulfur present in the diesel fuel is converted to $H_2S$ in the presence of the Co—Mo catalyst. The gaseous $H_2S$ subsequently reacts with ZnO to form solid ZnS according to reaction:

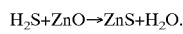

$$H_2S + ZnO \rightarrow ZnS + H_2O.$$

Continued reaction leads to the consumption of ZnO. Once the metal oxide bed is used up, it may be changed periodically. The metal sulfide, e.g., ZnS, may be discarded or used for further chemical processing. Alternatively, the metal sulfide may be regenerated by removing the sulfur and recovering the metal oxide.

The hydrodesulfurizer is used to substantially reduce the sulfur content of the diesel fuel to an acceptable level for introduction into the reformer section. For example, the sulfur content of the diesel fuel may be reduced to a level of less than about 1 part per million by weight, and preferably to less than about 0.2 part per million. The reformer section preferably operates at high pressure to reform the organic constituents of the desulfurized diesel fuel into a reformed fuel comprising lower molecular weight hydrocarbons, hydrogen and carbon monoxide. The lower molecular weight hydrocarbons include $C_1$–$C_2$ hydrocarbons, predominantly methane. Standard steam reforming processes take place in the reformer unit for the production and generation of $CH_4$, $H_2$, CO, etc. The steam to carbon ratio is preferably controlled in the reformer to prevent carbon deposition and catalyst breakdown.

Another variation of the system shown in FIG. 1 is schematically illustrated in FIG. 3. In the embodiment of FIG. 3, oxygen deficient air is used for combusting hydrocarbons in order to further lower the burner and combustion product temperatures due to the dilution effect produced by excess $N_2$ gas in the gas stream. The oxygen content of the air stream is preferably lowered by an oxygen separator, such as a conventional pressure swing absorption (PSA) oxygen removal system. For example, a 5 to 10 cubic foot PSA unit may provide air streams with 15 to 17 percent oxygen for the combustion of hydrocarbons.

Figure 4:
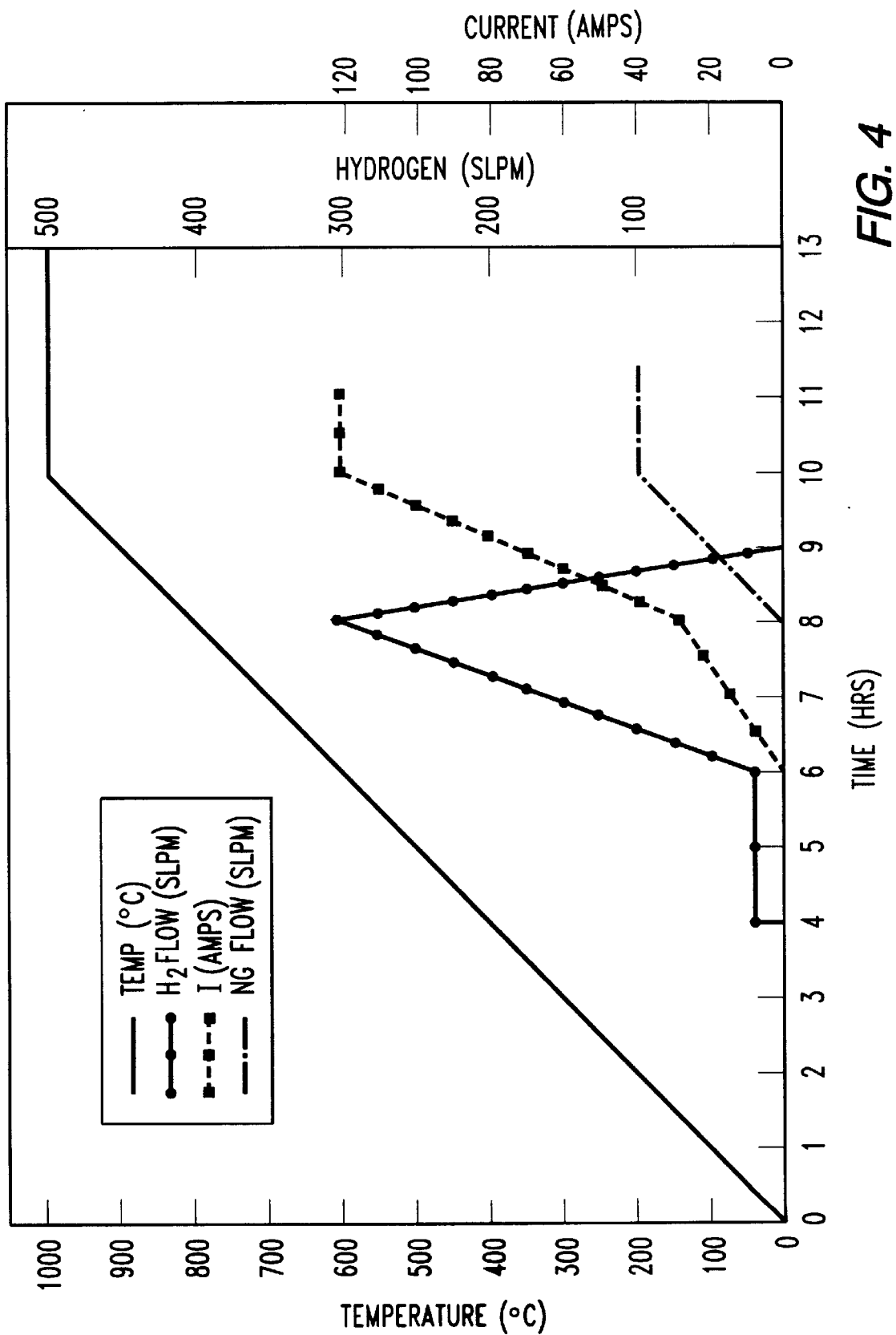
FIG. 4 is a graph illustrating the startup and operation of a solid oxide fuel cell in accordance with an embodiment of the present invention.

FIG. 4 illustrates the operation of a solid oxide fuel cell using startup gas and cover gas in accordance with an embodiment of the present invention. The temperature of the solid oxide fuel cell is increased at a constant rate from a cold start. Once a temperature of about 350° C. is reached, hydrogen cover gas flow is started at a flow rate of about 20 SLPM. At an SOFC temperature of about 600° C., the hydrogen cover gas flow is increased and current is drawn from the cell. At a temperature of about 800° C., a stream of natural gas is added, the current is ramped up, and the flow of hydrogen cover gas is ramped down. At a temperature of about 1000° C., steady current and natural gas flows are maintained, with no supply of the hydrogen cover gas.

The present system provides several advantages. A single system is preferably used to provide both non-explosive cover gas and hydrogen-rich startup gas. A regenerative hydrogen storage system is provided which is compact and is safer than hydrogen gas storage systems. Combustion product recirculation provides extended burner life and reduced carbon buildup. Various types of hydrocarbon fuels such as natural gas and diesel fuel may be used. Furthermore, a separate steam generation system is not required for startup operations.

While specific embodiments of the invention have been described in detail, it will be appreciated by those skilled in the art that various modifications, changes, adaptations and additions may be made within the scope of the invention, as set forth in the following claims.

What is claimed is:

1. A system for providing startup gas and cover gas in a solid oxide fuel cell power generation system comprising:
   a burner;
   means for supplying hydrocarbon fuel to the burner;
   means for supplying oxygen-containing gas to the burner;
   means for cooling a combustion gas exiting the burner;
   means for delivering at least a portion of the cooled combustion gas to a solid oxide fuel cell; and
   means for adding hydrogen gas to the combustion gas prior to delivery to the solid oxide fuel cell.

2. The system of claim 1, wherein the means for cooling the combustion gas exiting the burner comprises a heat exchanger.

3. The system of claim 1, wherein the means for cooling the combustion gas exiting the burner comprises a desulfurizing and reforming unit.

4. The system of claim 1, further comprising means for separating at least a portion of the oxygen from the oxygen-containing gas prior to delivery to the burner.

5. The system of claim 1, further comprising means for sensing the amount of oxygen contained in the oxygen-containing gas supplied to the burner.

6. The system of claim 5, further comprising means for adjusting the amount of oxygen-containing gas supplied to the burner based on the sensed amount of oxygen.

7. The system of claim 1, further comprising means for recirculating a portion of the cooled combustion gas to the burner.

8. The system of claim 1, wherein the means for delivering at least a portion of the cooled combustion gas to the solid oxide fuel cell comprises a gas storage tank.

9. The system of claim 1, wherein the means for adding hydrogen gas to the combustion gas prior to delivery to the solid oxide fuel cell comprises means for storing hydrogen in solid form.

10. The system of claim 9, wherein the means for storing hydrogen in solid form comprises a metal hydride.

11. A method of providing startup gas and cover gas in a solid oxide fuel cell power generation system, the method comprising:
    supplying hydrocarbon fuel and oxygen-containing gas to a burner;
    cooling combustion gas exiting the burner;
    delivering at least a portion of the cooled combustion gas to a solid oxide fuel cell; and
    adding hydrogen gas to the combustion gas prior to delivery to the solid oxide fuel cell.

12. The method of claim 11, wherein the combustion gas exiting the burner is cooled by a heat exchanger.

13. The method of claim 11, wherein the combustion gas exiting the burner is cooled by a desulfurizing and reforming unit.

14. The method of claim 11, further comprising separating at least a portion of the oxygen from the oxygen-containing gas prior to delivery to the burner.

15. The method of claim 11, further comprising sensing the amount of oxygen contained in the oxygen-containing gas supplied to the burner.

16. The method of claim 15, further comprising adjusting the amount of oxygen-containing gas supplied to the burner based on the sensed amount of oxygen.

17. The method of claim 11, further comprising recirculating a portion of the cooled combustion gas to the burner.

18. The method of claim 11, wherein the cooled combustion gas is delivered to the solid oxide fuel cell by a gas storage tank.

19. The method of claim 11, wherein the hydrogen gas is stored in solid form.

20. The method of claim 19, wherein the hydrogen is stored as a metal hydride.

* * * * *